(12) United States Patent
Wehner et al.

(10) Patent No.: US 12,422,250 B2
(45) Date of Patent: Sep. 23, 2025

(54) SYSTEMS AND METHODS FOR PASSIVE RANGING OF OBJECTS

(71) Applicant: Raytheon Company, Waltham, MA (US)

(72) Inventors: Justin Gordon Adams Wehner, Goleta, CA (US); Jamal Ibrahim Mustafa, Goleta, CA (US)

(73) Assignee: RTX Corporation, Arlington, VA (US)

( * ) Notice: Subject to any disclaimer, the term of this patent is extended or adjusted under 35 U.S.C. 154(b) by 1254 days.

(21) Appl. No.: 17/180,679

(22) Filed: Feb. 19, 2021

(65) Prior Publication Data
US 2022/0268570 A1    Aug. 25, 2022

(51) Int. Cl.
*G01B 11/14* (2006.01)
*G01C 7/02* (2006.01)

(52) U.S. Cl.
CPC .............. *G01B 11/14* (2013.01); *G01C 7/02* (2013.01)

(58) Field of Classification Search
CPC ................................ G01B 11/14; G01C 7/02
See application file for complete search history.

(56) References Cited

U.S. PATENT DOCUMENTS

| | | | |
|---|---|---|---|
| 8,400,511 B2 | 3/2013 | Wood et al. | |
| 9,121,702 B2 | 9/2015 | Kimura | |
| 9,467,616 B2 | 10/2016 | Yasugi et al. | |
| 9,693,034 B2 | 6/2017 | Lew et al. | |
| 9,964,405 B2 | 5/2018 | Maalouf et al. | |
| 10,021,290 B2 | 7/2018 | Takahashi | |
| 10,026,183 B2 | 7/2018 | Morgan-Mar et al. | |
| 10,070,038 B2 | 9/2018 | Komatsu | |
| 10,595,014 B2 * | 3/2020 | Muijs | G06T 7/70 |
| 2007/0103673 A1 * | 5/2007 | Ash | F41G 3/06 356/141.5 |
| 2018/0016444 A1 | 1/2018 | Michel et al. | |

FOREIGN PATENT DOCUMENTS

| | | |
|---|---|---|
| EP | 1338902 A1 | 8/2003 |
| JP | 2007086720 A | 4/2007 |

* cited by examiner

*Primary Examiner* — Isam A Alsomiri
*Assistant Examiner* — Sanjida Naser
(74) *Attorney, Agent, or Firm* — Kinney & Lange, P.A.

(57) ABSTRACT

Apparatus and associated methods relate to passive ranging of objects by using relative positional relation of the object to a coded aperture ranged object. A first range to a first object is determined via a coded-aperture ranging system based on a point spread function optimization of an image of the first object. The terrain surface between the first object and a second object is mapped via a 3D polarimetry system. A second range to the second object is then calculated via a range calculator based on the first range and the terrain surface between the first object and the second object.

20 Claims, 5 Drawing Sheets

SYSTEMS AND METHODS FOR PASSIVE RANGING OF OBJECTS

BACKGROUND

Various methods of ranging objects are in use today. Some ranging systems are used in ground-based applications and others are used for sea or airborne applications. Some of these ranging methods are passive, and others are active. Active ranging involves transmitting a signal, either from a ranging system or from another transmitter, to an object to be ranged and then sensing the reflection, scatter, echo, or return signal from the ranged object. Such active ranging systems can be disfavored in applications in which stealth is desired. Passive-ranging systems do not transmit a signal, and so can be used in such stealth-desired situations, or with systems with low-power requirements. Passive ranging systems typically are less precise than active ranging systems, and often do not meet range accuracy requirements for practical applications, especially at longer ranges.

SUMMARY

Apparatus and associated methods relate to a passive-ranging system that includes a coded-aperture ranging subsystem, a 3D polarimetry subsystem and a range calculator, the coded-aperture ranging subsystem determines a first range of a first object based on a point spread function optimization of an image of the first object. The 3D polarimetry subsystem determines terrain surface between the first object and a second object. The range calculator calculates a second range of the second object based on the first range and the terrain surface between the first object and the second object.

Some embodiments relate to a method for passive ranging of objects. The method includes determining, via a coded-aperture ranging subsystem, a first range of a first object based on a point spread function optimization of an image of the first object. The method includes determining, via a 3D polarimetry subsystem, terrain surface between the first object and a second object. Then the method calculates, via a range calculator, a second range of the second object based on the first range and the terrain surface between the first object and the second object.

DETAILED DESCRIPTION

Apparatus and associated methods relate to passive ranging of objects using both a coded-aperture ranging subsystem and a 3D polarimetry subsystem. The coded-aperture ranging subsystem determines range approximation to such objects based on a point spread function optimization of an image of the objects. The 3D polarimetry subsystem determines relative positional relationships (i.e., relative locations—locations relative to one another) of the objects based on 3D normal vector information from polarization imaging data. The terrain surface between any two objects can be mapped via a 3D polarimetry system. Such mapped terrain surface can be used to determine the relative positional relation of these two objects, between which the terrain surface has been mapped. This relative positional location of the two objects can be used to improve the range approximations of the two objects as determined by the coded-aperture ranging subsystem.

Figure 1:
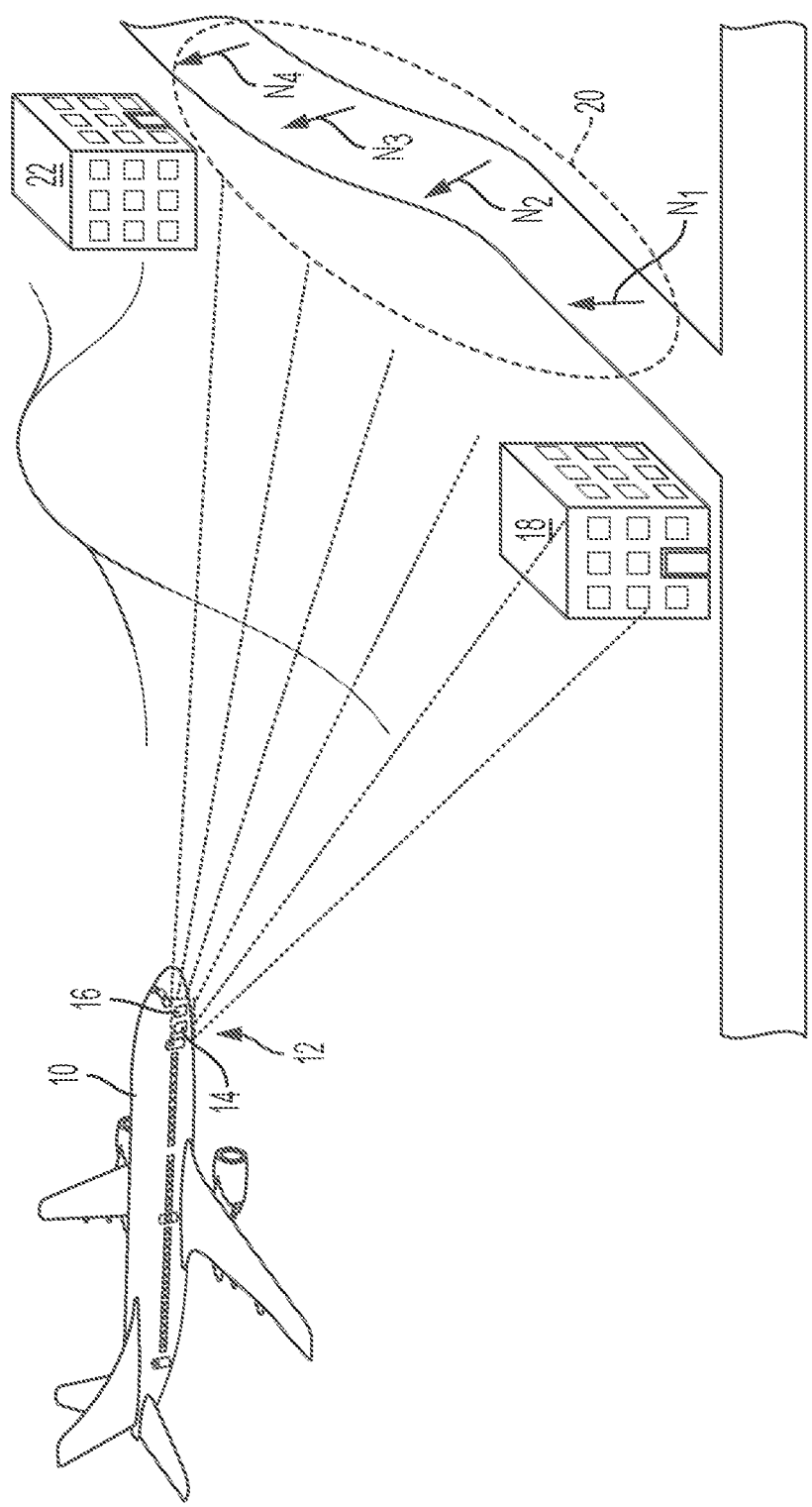
FIG. 1 is a perspective view of an aircraft equipped with a polarimetry-refined coded-aperture ranging system.

FIG. 1 is a perspective view of an aircraft equipped with a polarimetry-refined coded-aperture ranging system. In FIG. 1, aircraft 10 is equipped with polarimetry-refined coded-aperture ranging system 12. Polarimetry-refined coded-aperture ranging system 12 includes coded-aperture ranging subsystem 14 and 3D polarimetry subsystem 16. A first range approximation from aircraft 10 to first building 18 is determined using coded-aperture ranging subsystem 14. In some embodiments, a second range approximation from aircraft 10 to second building 20 can also be determined using coded-aperture ranging subsystem 14. Terrain surface 20 between first building 18 and second building 22 is mapped using 3D polarimetry subsystem 16. 3D polarimetry subsystem 16, for example, can determine surface normal data from polarimetric image data. In FIG. 1, for example, 3D polarimetry subsystem has determined surface normal vectors $N_1$, $N_2$, $N_3$, $N_4$ of terrain surface 20 at locations along a path between buildings 18 and 22. Location of second building 22 relative to first building 18 can be determined based on the map of terrain surface 20. The first and/or second range estimates can be improved using such determined relative locations of first and second buildings 18 and 22.

Because aircraft 10 is equipped with coded-aperture ranging subsystem 14, the second range from aircraft 20 to second building 22 can be directly determined using coded-aperture ranging subsystem 14. In some embodiments, however, accuracy of range to distant objects increases as the actual range increases. Accuracy of ranges determined for distant objects can be improved using terrain mapping between such distant objects and nearer object, whose ranges can be determined with better accuracy. In some embodiments, ranges to near objects and distant objects are determined using coded-aperture ranging subsystem 14. Then a terrain surface that is contiguous between the first and second objects is mapped using 3D polarimetry subsystem 16. The range(s) determined of one or both of the near and distant objects can then be refined based on the terrain surface mapped. For example, a statistical best fit analysis (e.g., a weighted least squares fit) can refine the range(s) determined.

Figure 2:
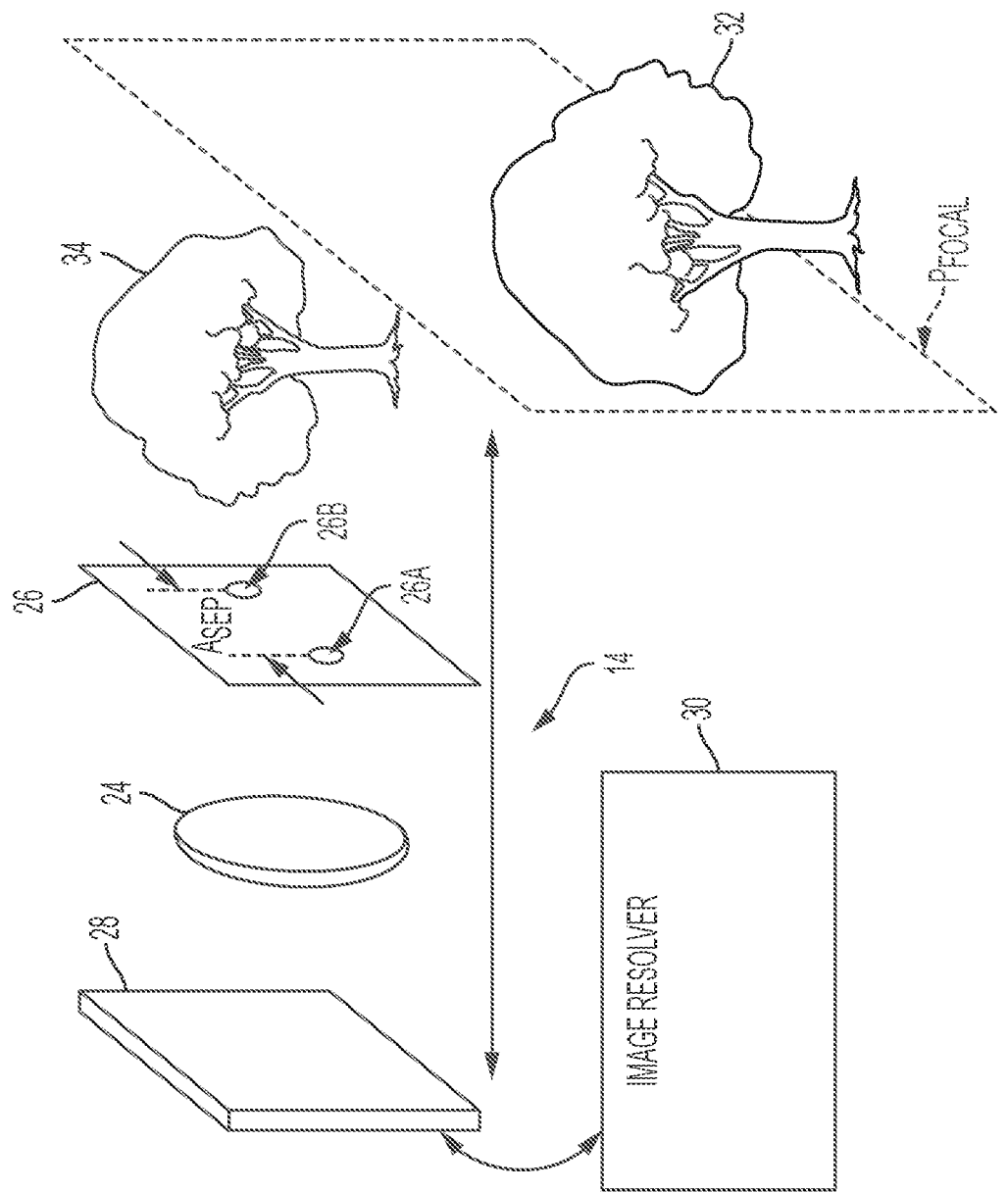
FIG. 2 is a schematic diagram depicting coded-aperture ranging based on a point spread function optimization of an imaged object.

FIG. 2 is a schematic diagram depicting coded-aperture ranging based on a point spread function optimization of an imaged object. In FIG. 2, coded-aperture ranging subsystem 14 includes lens (or lens stack) 24, coded aperture 26, focal plane array 28 and image resolver 30. In the depicted embodiment, coded aperture 26 includes two apertures 26A and 26B separated by separation distance $A_{SEPARATION}$. Such a simple coded-aperture as depicted in FIG. 2 is shown so as to provide a simple demonstration of the nature of the blurring that is obtained for images of objects located at a distance from the focal plane array. In other embodiments, various other coded-apertures can be used.

Regardless of the shape of coded aperture 26, objects located at focal plane $P_{FOCAL}$ of coded-aperture ranging subsystem 14 will be in focus (i.e., or optimally focused with regard to a diffraction limitation of the system). All other objects not located at focus plane $P_{FOCAL}$ will be out of focus (e.g., not optimally focused), at least to some extent. The further away an object is located from focal plane $P_{FOCAL}$, the more out of focus the object's image becomes. Therefore, coded-aperture ranging subsystem 14 can use the focus quality of each of the objects' images to determine distance of the object, which corresponds to the object's image, from focal plane $P_{FOCAL}$. This determined distance (i.e., distance of the object from focal plane $P_{FOCAL}$) can then be used to determine range of the object from coded-aperture ranging subsystem 14.

For example, for the dual aperture configuration as depicted in FIG. 2, an object will be blurred in duplicate fashion, if the object is located at a distance from focal plane $P_{FOCAL}$. The separation distance between the blurred duplicate image is indicative of the distance that the object is from focal plane $P_{FOCAL}$. If, for example, coded-aperture ranging subsystem 14 is designed such that focal plane $P_{FOCAL}$ of the system is at infinity (∞), then the blurring of the image will be related to the inverse distance ($1/R_{OBJECT}$) of the object from the inverse of infinity (1/∞) or zero (0). Because of this inverse range relation of blurring to. A metric that can be used as a measure of focus is the point spread function—how a point object would be imaged by coded-aperture ranging subsystem 14 as a function of distance from coded-aperture ranging subsystem 14.

The point spread function is a measure of how blurred or out-of-focus an imaged point is. This measure of blur or out-of-focus is indicative of a difference between the ranges to the object and the focal plane of the coded-aperture ranging subsystem. Thus, a point spread function of an image portion corresponding to the object being ranged is determined/measured. This determined/measured point spread function is used to calculate a difference between the ranges of that object and the focal plane array of the imaging subsystem. A sum of the range to the focal plane and the range difference calculated based on the determined/measured point spread function provides a range approximation to that object. Such a ranging algorithm is said to be based on point spread function optimization. That is, point spread function optimization is determining the point spread function that corresponds to an imaged object.

The scene imaged onto focal plane array 28 of coded-aperture ranging subsystem 14 includes tress 32 and 34. Trees 32 and 34 are located at different distances from focal plane $P_{FOCAL}$. Tree 32 is located at or very near to focal plane $P_{FOCAL}$. Tree 34, however, is located at some distance nearer to coded-aperture ranging subsystem 14 than is focal plane $P_{FOCAL}$. Thus, tree 32 will optimally focused onto focal plane array 28, whereas tree 34 will not be optimally focused thereonto. An example of an image taken by coded-aperture ranging subsystem 14 will be depicted in FIG. 3.

Figure 3:
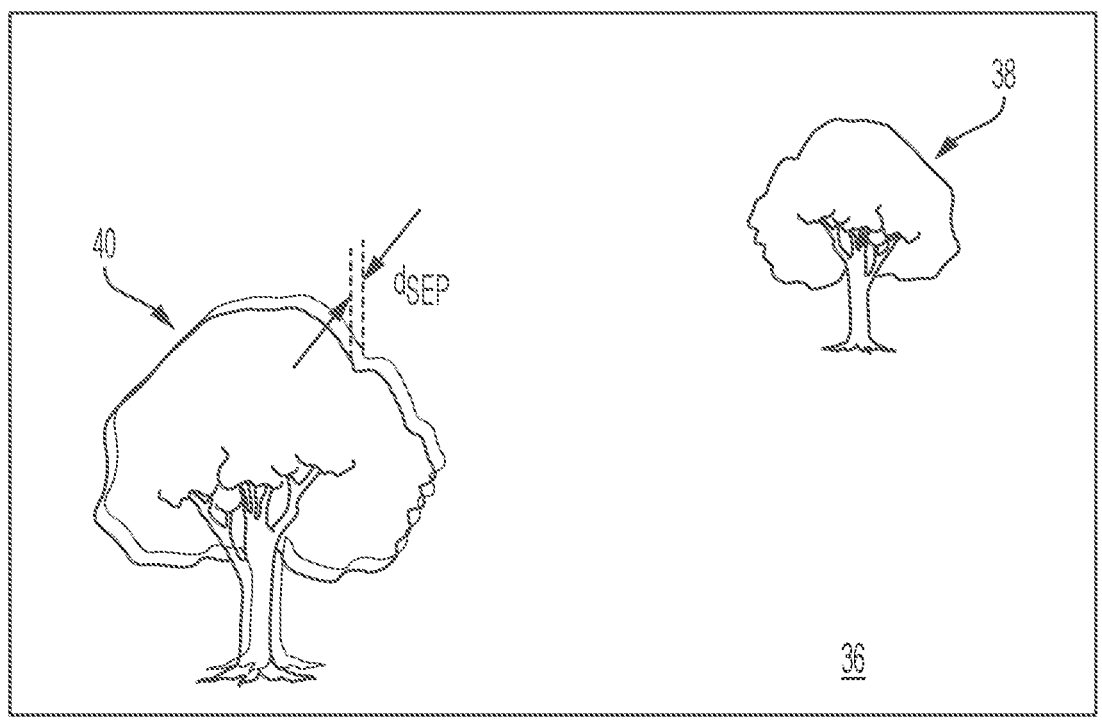
FIG. 3 is an image of a scene as imaged by the embodiment depicted in FIG. 2 of coded-aperture ranging subsystem 14.

FIG. 3 is an image of a scene as imaged by the embodiment depicted in FIG. 2 of coded-aperture ranging subsystem 14. In FIG. 3, image 36 include imaged objects 38 and 40, which correspond to trees 32 and 34. Imaged object 38 has precise features resulting from in-focus imaging of tree 32. Imaged object 40, however, is doubly imaged, each of the doubly imaged sub-images corresponds to light that was received by coded-aperture ranging subsystem 14 via a different one of apertures 26A and 26B depicted in FIG. 2. Separation distance $d_{SEP}$ between these two sub-images is indicative of the distance between tree 34 and focal plane $P_{FOCAL}$. With more complicated coded apertures than the one depicted in FIG. 2, imaged objects corresponding to objects located away from focal plane $P_{FOCAL}$ will have different characteristics than those depicted in imaged object 40. Such characteristics can be used, none-the-less, to determine distance of the corresponding objects from focal plane $P_{FOCAL}$. These blurred image objects are essentially a focused imaged object convolved with a point spread function that corresponds to the particular aperture structure used by coded-aperture ranging subsystem 14.

Figure 4:
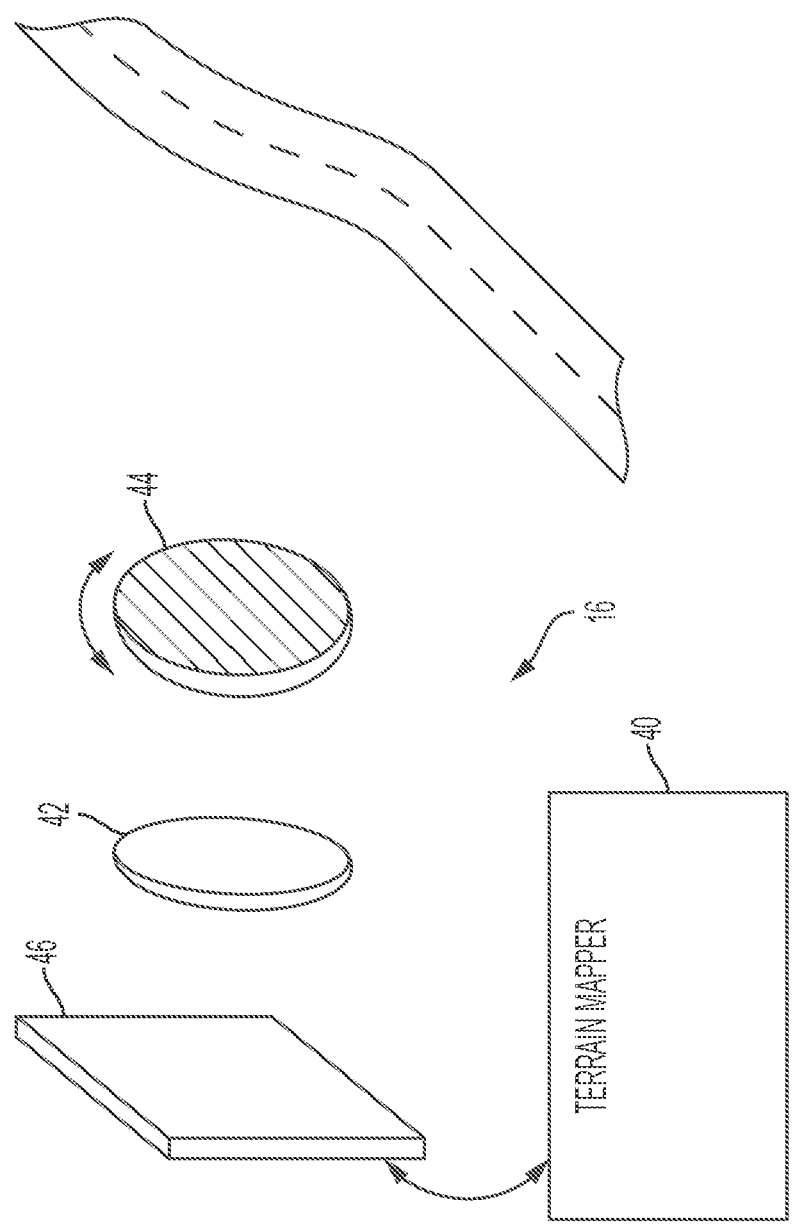
FIG. 4 is a schematic diagram depicting 3D polarimetry obtaining a surface terrain.

FIG. 4 is a schematic diagram depicting 3D polarimetry obtaining a surface terrain. In FIG. 4, 3D polarimetry subsystem 16 includes lens (or lens stack) 42, polarizing filter 44, focal plane array 46 and terrain mapper 48. In the depicted embodiment, polarizing filter 44 can be rotated so as to permit light to pass therethrough of different polarizations. In some embodiments, two (or more) focal plane arrays are used to image the scene, each using a polarizing filter dedicated itself. Such polarizing filters can be configured to transmit light orthogonally polarized from one another, for example (e.g., horizontal and vertical polarizations, right and left circularly polarizations, etc.).

Relative amplitudes of image objects can be indicative of orientation of such objects. For example, a road that is perfectly level can reflect light that has one polarization state, whereas a road that is inclined with respect to a level surface can reflect light having a polarization state different from that of the light reflected by the level road. A normal vector corresponding to each surface imaged by 3D polarimetry subsystem 16 can be determined by the polarization state of the light reflected by such a surface. Terrain mapper 48 can then map the terrain surface based on the determined normal vectors corresponding to the reflecting surfaces. This terrain map can then be used to calculate relative locations of all points within the terrain surface and of the objects between which the terrain surface has been mapped. The objects (e.g., buildings 18 and 20) can also be mapped so as to generate a map of both the terrain surface and the objects located therein.

Figure 5:
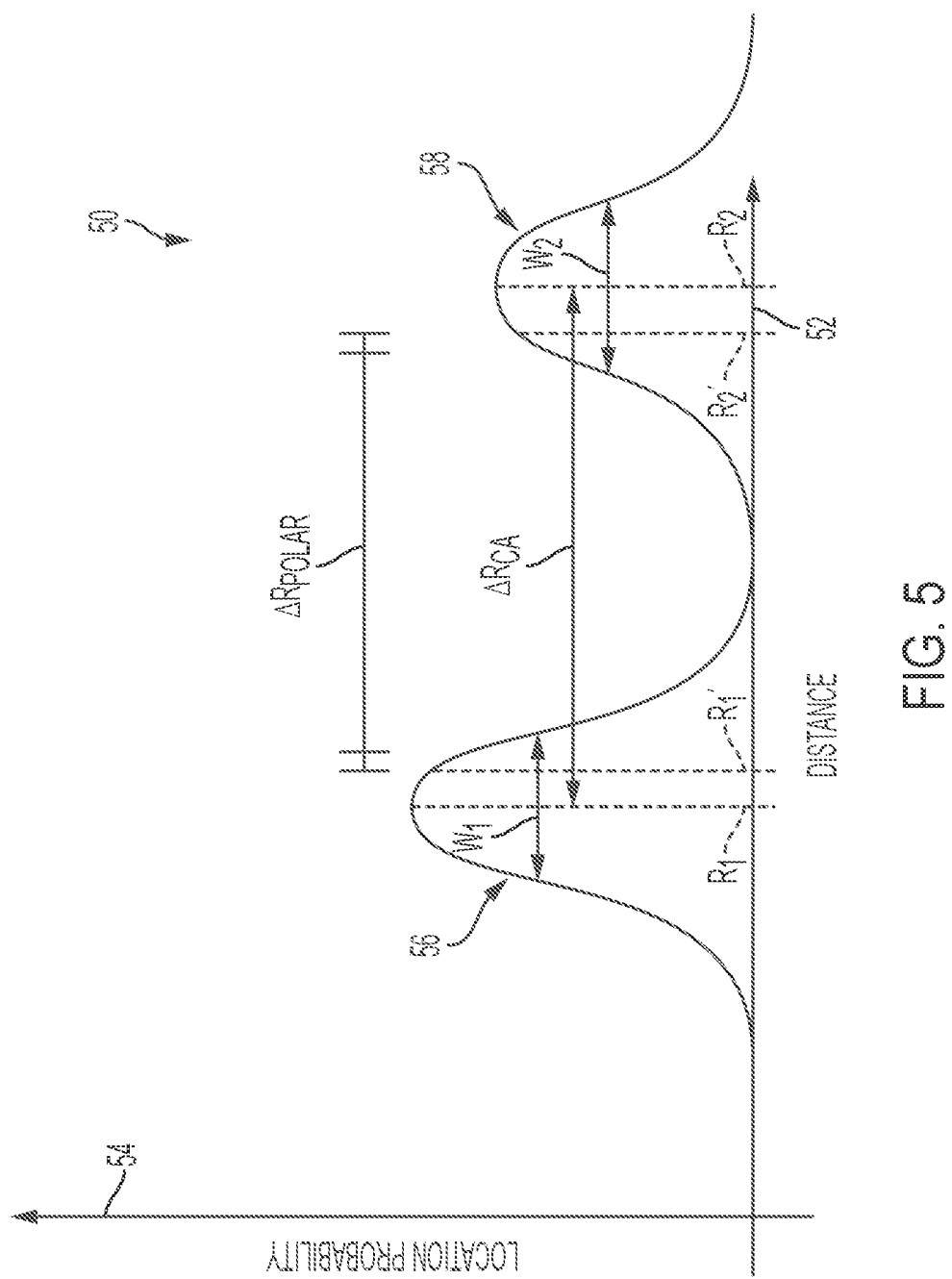
FIG. 5 is a graph depicting the range distribution probability functions of coded aperture ranging with and without polarimetry refinement.

FIG. 5 is a graph depicting the range distribution probability functions of coded aperture ranging with and without polarimetry refinement. In FIG. 5, graph 50 includes horizontal axis 52 and vertical axis 54. Horizontal axis 52 is indicative of distance from a polarimetry-refined coded-aperture ranging system, such as a polarimetry-refined coded-aperture ranging system 12 depicted in FIG. 1. Vertical axis 54 is indicative of probability of object locations. Graph 50 also includes probability distributions 56 and 58 corresponding to two objects, such as, for example, buildings 18 and 22 depicted in FIG. 1. Probability distribution 56 indicates the location of a near object as determined by coded-aperture ranging subsystem 14 depicted in FIG. 1. Probability distribution 58 indicates the location of a distant object as determined by coded-aperture ranging subsystem 14 depicted in FIG. 1.

Coded-aperture ranging subsystem 14 determined the location of the near object to be at a range of $R_1$ from polarimetry-refined coded-aperture ranging system 12, as indicated by the location of the peak of probability distribution 56. The width $W_1$ of probability distribution 56 indicates an uncertainty of the location about the determined range $R_1$. Similarly, coded-aperture ranging subsystem 14 determined the location of the distant object to be at a range of $R_2$ from polarimetry-refined coded-aperture ranging system 12, as indicated by the location of the peak of probability distribution 58. The width $W_2$ of probability distribution 58 indicates an uncertainty of the location about the determined range $R_2$. Width $W_2$ is greater than width $W_1$ because coded-aperture ranging subsystem 14 can determine range of objects with more precision for near objects than for distant objects. These widths $W_1$ and $W_2$ are indicative of a confidence value of the determined ranges $R_1$ and $R_2$, respectively. Such confidence values can be used in determination of corrected ranges $R_1'$ and $R_2'$, as will be described further.

As indicated on graph 50, 3D polarimetry subsystem 16 determined relative range difference $\Delta R_{POLAR}$ between the near object and the distant object. Range difference $\Delta R_{POLAR}$ is less than range difference $\Delta R_{CA}$ as determined by coded-aperture ranging subsystem 14. Such a range difference $\Delta R_{POLAR}$ as determined by 3D polarimetry subsystem 16 can be more precise than range difference $\Delta R_{CA}$ as determined by coded-aperture ranging subsystem 14. Using range difference $\Delta R_{POLAR}$ in conjunction with probability distributions 56 and 58, corrected ranges $R_1'$ and $R_2'$ can be calculated.

In some embodiments, ranges of near objects are determined using coded-aperture ranging subsystem 14, but ranges of distant objects are obtained using only the range of the determined near object and the range difference $\Delta R_{POLAR}$ between the near object and the distant object as determined by 3D polarimetry subsystem 16. In some embodiments a contiguous region of terrain between the near and distant objects is mapped so as to determine range difference $\Delta R_{POLAR}$ between the near object and the distant object. In some embodiment such a contiguous region is a contiguous path from the near object to the distant object.

In some embodiments, polarimetry-refined coded-aperture ranging system 12 is configured to be carried about an aircraft. In some such aircraft borne embodiments, altimeter data can be used in combination of the data obtained by coded-aperture ranging subsystem 14 and 3D polarimetry subsystem 16 to improve range calculations.

Discussion of Possible Embodiments

The following are non-exclusive descriptions of possible embodiments of the present invention.

Apparatus and associated methods relate to a passive-ranging system that includes a coded-aperture ranging subsystem, a 3D polarimetry subsystem and a range calculator, the coded-aperture ranging subsystem determines a first range of a first object based on a point spread function optimization of an image of the first object. The 3D polarimetry subsystem determines terrain surface between the first object and a second object. The range calculator calculates a second range of the second object based on the first range and the terrain surface between the first object and the second object.

The system of the preceding paragraph can optionally include, additionally and/or alternatively, any one or more of the following features, configurations and/or additional components:

A further embodiment of the foregoing system, wherein the coded-aperture ranging subsystem can further determine a third range of the second object.

A further embodiment of any of the foregoing systems, wherein the range calculator can further improve accuracy of the second range of the second object based on the third range of the second object.

A further embodiment of any of the foregoing systems, wherein the range calculator can further determine a relative location of the second object from the first object based on the terrain surface between the first object and the second object.

A further embodiment of any of the foregoing systems, wherein the range calculator can determine the second range of the second object further based on a geometric calculation of a delta range between the first and second objects based on the relative location determined.

A further embodiment of any of the foregoing systems, wherein the passive-ranging subsystem can be configured to be carried by an airborne vehicle. The passive-ranging system can further include an altimeter that determines an altitude of the airborne vehicle.

A further embodiment of any of the foregoing systems, wherein the coded-aperture ranging subsystem can determine the first range of the object further based on the altitude of the airborne vehicle.

A further embodiment of any of the foregoing systems, wherein the range calculator can further determine a first confidence value of the first range determined.

A further embodiment of any of the foregoing systems, wherein the range calculator can further determine a second confidence value of the terrain surface determined.

A further embodiment of any of the foregoing systems, wherein the range calculator can further determine a third confidence value of the second range based on the first and second confidence values.

Some embodiments relate to a method for passive ranging of objects. The method includes determining, via a coded-aperture ranging subsystem, a first range of a first object based on a point spread function optimization of an image of the first object. The method includes determining, via a 3D polarimetry subsystem, terrain surface between the first object and a second object. Then the method calculates, via a range calculator, a second range of the second object based on the first range and the terrain surface between the first object and the second object.

The method of the preceding paragraph can optionally include, additionally and/or alternatively, any one or more of the following features, configurations and/or additional components:

A further embodiment of the foregoing method can further include determining, via the coded-aperture ranging subsystem, a third range of the second object.

A further embodiment of any of the foregoing methods can further include improving accuracy, via the range calculator, of the second range of the second object based on the third range of the second object.

A further embodiment of any of the foregoing methods can further include determining, via the range calculator, a relative location of the second object from the first object based on the terrain surface between the first object and the second object.

A further embodiment of any of the foregoing methods can further include determining, via the range calculator, the second range of the second object further based on a geometric calculation of a delta range between the first and second objects based on the relative location determined.

A further embodiment of any of the foregoing methods, wherein the passive-ranging system can be configured to be carried by an airborne vehicle. The method can further include determining, via an altimeter, an altitude of the airborne vehicle.

A further embodiment of any of the foregoing methods can further include determining, via the coded-aperture ranging subsystem, the first range of the object further based on the altitude of the airborne vehicle.

A further embodiment of any of the foregoing methods can further include determining, via the range calculator, a first confidence value of the first range determined.

A further embodiment of any of the foregoing methods can further include determining, via the range calculator, a second confidence value of the terrain surface determined.

A further embodiment of any of the foregoing methods can further include determining, via the range calculator, a third confidence value of the second range based on the first and second confidence values.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A passive-ranging system comprising:
    a coded-aperture ranging subsystem that determines a first range of a first object based on a point spread function optimization of an image of the first object;
    a 3D polarimetry subsystem that determines terrain surface between the first object and a second object; and
    a range calculator that calculates a second range of the second object based on the first range and the terrain surface between the first object and the second object.

2. The passive-ranging system of claim 1, wherein the coded-aperture ranging subsystem further determines a third range of the second object.

3. The passive-ranging system of claim 2, wherein the range calculator further improves accuracy of the second range of the second object based on the third range of the second object.

4. The passive-ranging system of claim 1, wherein the range calculator further determines a relative location of the second object from the first object based on the terrain surface between the first object and the second object.

5. The passive-ranging system of claim 4, wherein the range calculator determines the second range of the second object further based on a geometric calculation of a delta range between the first and second objects based on the relative location determined.

6. The passive-ranging system of claim 1, wherein the passive-ranging subsystem is configured to be carried by an airborne vehicle, the passive-ranging system further comprising:
    an altimeter that determines an altitude of the airborne vehicle.

7. The passive-ranging system of claim 6, wherein the coded-aperture ranging subsystem determines the first range of the object further based on the altitude of the airborne vehicle.

8. The passive-ranging system of claim 1, wherein the range calculator further determines a first confidence value of the first range determined.

9. The passive-ranging system of claim 8, wherein the range calculator further determines a second confidence value of the terrain surface determined.

10. The passive-ranging system of claim 9, wherein the range calculator further determines a third confidence value of the second range based on the first and second confidence values.

11. A method for passive ranging of objects, the method comprising:
    determining, via a coded-aperture ranging subsystem, a first range of a first object based on a point spread function optimization of an image of the first object;
    determining, via a 3D polarimetry subsystem, terrain surface between the first object and a second object; and
    calculating, via a range calculator, a second range of the second object based on the first range and the terrain surface between the first object and the second object.

12. The method of claim 11, further comprising:
    determining, via the coded-aperture ranging subsystem, a third range of the second object.

13. The method of claim 12, further comprising:
    improving accuracy, via the range calculator, of the second range of the second object based on the third range of the second object.

14. The method of claim 11, further comprising:
    determining, via the range calculator, a relative location of the second object from the first object based on the terrain surface between the first object and the second object.

15. The method of claim 14, further comprising:
    determining, via the range calculator, the second range of the second object further based on a geometric calculation of a delta range between the first and second objects based on the relative location determined.

16. The method of claim 11, wherein the passive-ranging system is configured to be carried by an airborne vehicle, the method further comprising:
    determining, via an altimeter, an altitude of the airborne vehicle.

17. The method of claim 16, further comprising:
    determining, via the coded-aperture ranging subsystem, the first range of the object further based on the altitude of the airborne vehicle.

18. The method of claim 11, further comprising:
    determining, via the range calculator, a first confidence value of the first range determined.

19. The method of claim 18, further comprising:
    determining, via the range calculator, a second confidence value of the terrain surface determined.

20. The method of claim 19, further comprising:
    determining, via the range calculator, a third confidence value of the second range based on the first and second confidence values.

* * * * *